(12) United States Patent
Kanayama

(10) Patent No.: US 7,523,347 B2
(45) Date of Patent: Apr. 21, 2009

(54) RAID CONTROL APPARATUS, AND RAID CONTROL PROGRAM AND RAID CONTROL METHOD

(75) Inventor: Tomoyuki Kanayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 465 days.

(21) Appl. No.: 11/376,180

(22) Filed: Mar. 16, 2006

(65) Prior Publication Data

US 2007/0174674 A1  Jul. 26, 2007

(30) Foreign Application Priority Data

Dec. 14, 2005 (JP) ............................. 2005-360213

(51) Int. Cl.
*G06F 11/00* (2006.01)
(52) U.S. Cl. ...................................................... 714/11
(58) Field of Classification Search ............... 714/5–13, 714/16, 20, 27, 31, 42, 47, 54, 15
See application file for complete search history.

(56) References Cited

U.S. PATENT DOCUMENTS 5,367,669 A * 11/1994 Holland et al. ................. 714/7
6,931,576 B2 * 8/2005 Morrison et al. ............. 714/54
7,209,981 B1 * 4/2007 Wade et al. .................... 710/38
7,213,102 B2 * 5/2007 Buchanan et al. ........... 711/114
7,356,638 B2 * 4/2008 Holland et al. .............. 710/316
2004/0268179 A1 * 12/2004 Stewart ........................... 714/8

FOREIGN PATENT DOCUMENTS

JP         08-241173         9/1996
JP         08-249130         9/1996

* cited by examiner

*Primary Examiner*—Nadeem Iqbal
(74) *Attorney, Agent, or Firm*—Staas & Halsey LLP

(57) ABSTRACT

A RAID control apparatus is able to cooperate with another RAID control apparatus to control at least one RAID apparatus. The RAID control apparatus comprises a diagnosis unit and a control unit. The diagnosis unit diagnoses the other RAID control apparatus when an disk error is detected. The control unit stops controlling the RAID apparatus in cooperation with the other RAID control apparatus, whereby only the RAID control apparatus controls the RAID apparatus, when the diagnosis unit determines that the other RAID control apparatus has a trouble. The control unit causes only the other RAID control apparatus to control the RAID apparatus when a disk error is detected while only the RAID control apparatus is controlling the RAID apparatus.

18 Claims, 4 Drawing Sheets

| DISK NO. | 1 | 2 | 3 | 4 | 5 |
|---|---|---|---|---|---|
| ORDER IN WHICH ERRORS OCCUR IN DISKS | --- | 2 | --- | 3 | 1 |
| ORDER IN WHICH TO RECOVER DISKS | --- | 2 | --- | 1 | 3 |
| METHODS OF RECOVERING DISKS | --- | FORCEDLY INCORPORATING THE DISK | --- | FORCEDLY INCORPORATING THE DISK | DISK EXCHANGE (RAID 5 ACHIEVES AUTOMATIC REBUILDING) |

RAID CONTROL APPARATUS, AND RAID CONTROL PROGRAM AND RAID CONTROL METHOD

BACKGROUND OF THE INVENTION

1. Field of the Invention

The present invention relates to a RAID control apparatus, RAID control program and a RAID control method, which perform recovery of data when a trouble occurs in RAID (Redundant Arrays of Inexpensive Disks) apparatuses.

2. Description of the Related Art

FIG. 4 is a block diagram showing the configuration of a conventional RAID apparatus. This RAID apparatus comprises RAID control apparatuses 111a and 111b, discs drives 21a, 21b, 21c, 21d and 21e. The RAID control apparatuses 111a and 111b control the disks 21a, 21b, 21c, 21d and 21e. Thus, the disks 21a, 21b, 21c, 21d and 21e constitute a RAID group of RAID 5.

In the RAID apparatus, two or more of the disks that constitute the RAID group may make errors (or the RAID apparatus may assume multi dead/multi unmount state). In this case, the RAID redundancy configuration is destroyed. Consequently, the RAID apparatus can no longer recover data.

A conventional multi-dead/multi-unmount recovery method will be described. FIG. 5 is a table that shows an order in which the disks are recovered in this multi-dead/multi-unmount recovery method. The table shows the serial numbers of the disks, the order in which the disks come to have errors, the order in which the disks are recovered, and the methods for recovering data in the respective disks. In the multi-dead/multi-unmount recovery method, the disks (of the RAID group) having errors are incorporated into the system, in the order reverse to the order they have come to have errors. Thus, the disk that has come to have errors last is incorporated into the system first, and the disk that has come to have errors first is incorporated into the system last. The disk that has come to errors first is replaced last and is then recovered from the errors in rebuild process.

This multi-dead/multi-unmount recovery method can recover the RAID apparatus to the state that the apparatus had immediately before the process of writing data in any disk stopped.

Jpn. Pat. Appln. Laid-Open Publication No. 8-249130 discloses a prior-art technique that is relevant to the present invention. The publication discloses a trouble-detecting system. In the trouble-detecting system, the first controller makes a request for access to the memory managed by the second controller, when makes access to the memory it manages. If the first controller receives no access permission, a trouble will be considered to have occurred in the second controller.

The multi-dead/multi-unmount recovery method described above works well only if the multi dead/multi unmount state is not one resulting from troubles in the RAID control apparatus (for example, a multi dead/multi unmount state resulting from a trouble on the FC (Fiber Channel) loop).

In the multi dead/multi unmount state resulting from any trouble in the RAID control apparatus, the RAID configuration can be recovered by the conventional multi-dead/multi-unmount recovery method. Nevertheless, the RAID configuration will probably have a similar trouble right after it is so recovered. Not only much time will be required to recover the system, but also the data will most likely change or will be lost while the system is being recovered.

A multi dead/multi unmount state may result from troubles in the RAID control apparatus if a trouble develops in the device that controls the disk-mounting or a signal line provided in the RAID control apparatus. Consequently, the system cannot locate any disks. In this case, the LEDs on both the disk drives and the RAID control apparatus may be turned on and emit light, informing the user of the error. However, the user cannot determine whether the errors have resulted from any troubles in the RAID control apparatus.

SUMMARY OF THE INVENTION

The present invention has been made to solve the problems described above. An object of the invention is to provide a RAID control apparatus, a RAID control program and a RAID control method, which automatically recover a RAID apparatus even if disk errors occur due to troubles in the RAID apparatus.

To achieve the object described above, this invention provides a RAID control apparatus that can cooperate with another RAID control apparatus to control at least one RAID apparatus. The RAID control apparatus comprises: a diagnosis unit that diagnoses the other RAID control apparatus when an disk error is detected; and a control unit that stops controlling the RAID apparatus in cooperation with the other RAID control apparatus, whereby only the RAID control apparatus controls the RAID apparatus, when the diagnosis unit determines that the other RAID control apparatus has a trouble, and that causes only the other RAID control apparatus to control the RAID apparatus when a disk error is detected while only the RAID control apparatus is controlling the RAID apparatus.

A RAID control apparatus of the type according to this invention, further comprises a recovery unit that makes a disk having an error usable when no disk errors are detected within a preset time after the RAID control apparatus has started controlling the RAID apparatus alone, thereby to recover the RAID apparatus automatically.

In a RAID control apparatus of the type according to the present invention, the recovery unit determines that a cause of a disk error lies in the other RAID control apparatus when no disk errors are detected within the preset time after the RAID control apparatus has started controlling the RAID apparatus alone.

In a RAID control apparatus of the type according to this invention, the recovery unit helps to recover the RAID apparatus when the diagnosis unit determines that the other RAID control apparatus has no troubles.

In a RAID control apparatus of the type according to the present invention, the recovery unit helps to recover the RAID apparatus when a disk error is detected while controlling the RAID apparatus alone, after the control by only the other RAID control apparatus has been switched to the control by only the RAID control apparatus.

In a RAID control apparatus of the type according to this invention, the recovery unit performs the automatic recovery in accordance with diagnosis made by the diagnosis unit or diagnosis made by the recovery unit.

A RAID control program causes a computer provided in a RAID control apparatus to control at least one RAID apparatus in cooperation with another RAID control apparatus. The program comprises: a diagnosis step that diagnoses the other RAID control apparatus when a disk error is detected; and a control step that stops controlling the RAID apparatus in cooperation with the other RAID control apparatus, whereby only the RAID control apparatus controls the RAID apparatus, when the diagnosis step determines that the other RAID control apparatus has a trouble, and that causes only the other RAID control apparatus to control the RAID apparatus when a disk error is detected while only the RAID control apparatus is controlling the RAID apparatus.

A RAID control program of the type according to the present invention, causes the computer to perform a recovery step that makes a disk having an error usable when no disk errors are detected within a preset time after the RAID control apparatus has started controlling the RAID apparatus alone, thereby to recover the RAID apparatus automatically.

In a RAID control program of the type according to the present invention, the recovery step determines that a cause of a disk error lies in the other RAID control apparatus when no disk errors are detected within the preset time after the RAID control apparatus has started controlling the RAID apparatus alone.

In a RAID control program of the type according to the present invention, the recovery step helps to recover the RAID apparatus when the diagnosis step determines that the other RAID control apparatus has no troubles.

In a RAID control program of the type according to the present invention, the recovery step helps to recover the RAID apparatus when a disk error is detected while controlling the RAID apparatus alone, after the control by only the other RAID control apparatus has been switched to the control by only the RAID control apparatus.

In a RAID control program of the type according to the present invention, the recovery step performs the automatic recovery in accordance with diagnosis made in the diagnosis step or diagnosis made in the recovery step.

A RAID control method according to this invention is designed for use in a RAID control apparatus that is able to cooperate with another RAID control apparatus to control at least one RAID apparatus. The RAID control method comprises: a diagnosis step that diagnoses the other RAID control apparatus when a disk error is detected; and a control step that stops controlling the RAID apparatus in cooperation with the other RAID control apparatus, whereby only the RAID control apparatus controls the RAID apparatus, when the diagnosis step determines that the other RAID control apparatus has a trouble, and that causes only the other RAID control apparatus to control the RAID apparatus when a disk error is detected while only the RAID control apparatus is controlling the RAID apparatus.

This invention makes it possible to recover any RAID apparatus automatically when the RAID apparatus has disk errors resulting from the trouble in the RAID control apparatus.

DETAILED DESCRIPTION OF THE PREFERRED EMBODIMENTS

An embodiment of the present invention will be described, with reference to the accompanying drawings.

The configuration of a RAID apparatus using a RAID control apparatus according to the embodiment of this invention will be described first.

Figure 1:
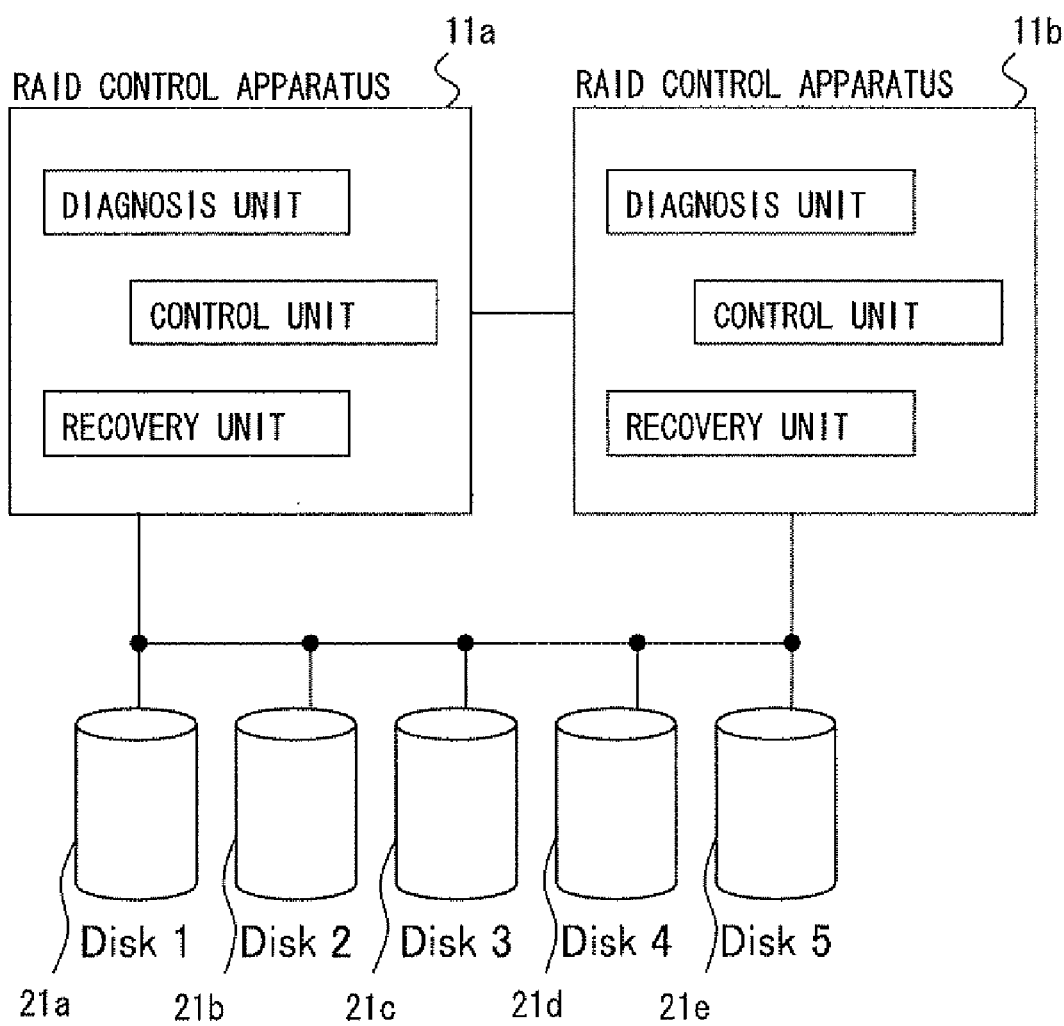
FIG. 1 is a block diagram showing a RAID apparatus according to the present invention.
Figures 4, 5:
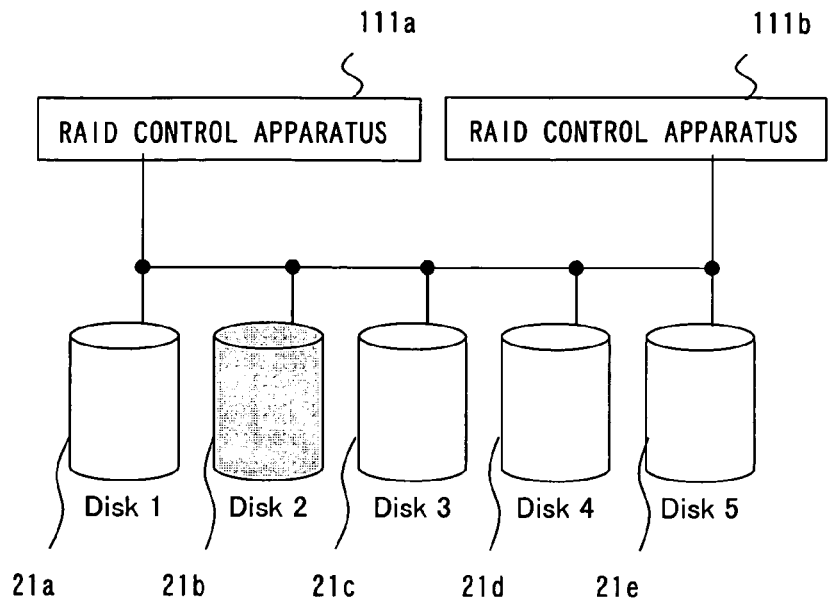
FIG. 4 is a block diagram illustrating a conventional RAID apparatus.
FIG. 5 is a table that shows an order in which the disks are recovered in the conventional multi-dead/multi-unmount recovery method.

FIG. 1 is a block diagram showing the RAID apparatus according to the embodiment of the present invention. The components identical to those shown in FIG. 4 are designated at the same reference numerals in FIG. 1 and will not be described in detail. The RAID apparatus differs from the one shown in FIG. 4 in that RAID control apparatuses $11a$ and $11b$ are provided in place of the RAID control apparatuses $111a$ and $111b$. The RAID control apparatuses $11a$ and $11b$ control the disks $21a$, $21b$, $21c$, $21d$ and $21e$. Hence, the disks $21a$, $21b$, $21c$, $21d$ and $21e$ constitute a RAID group of RAID 5.

How the RAID control apparatus $11a$ operates will be explained.

Figure 2:
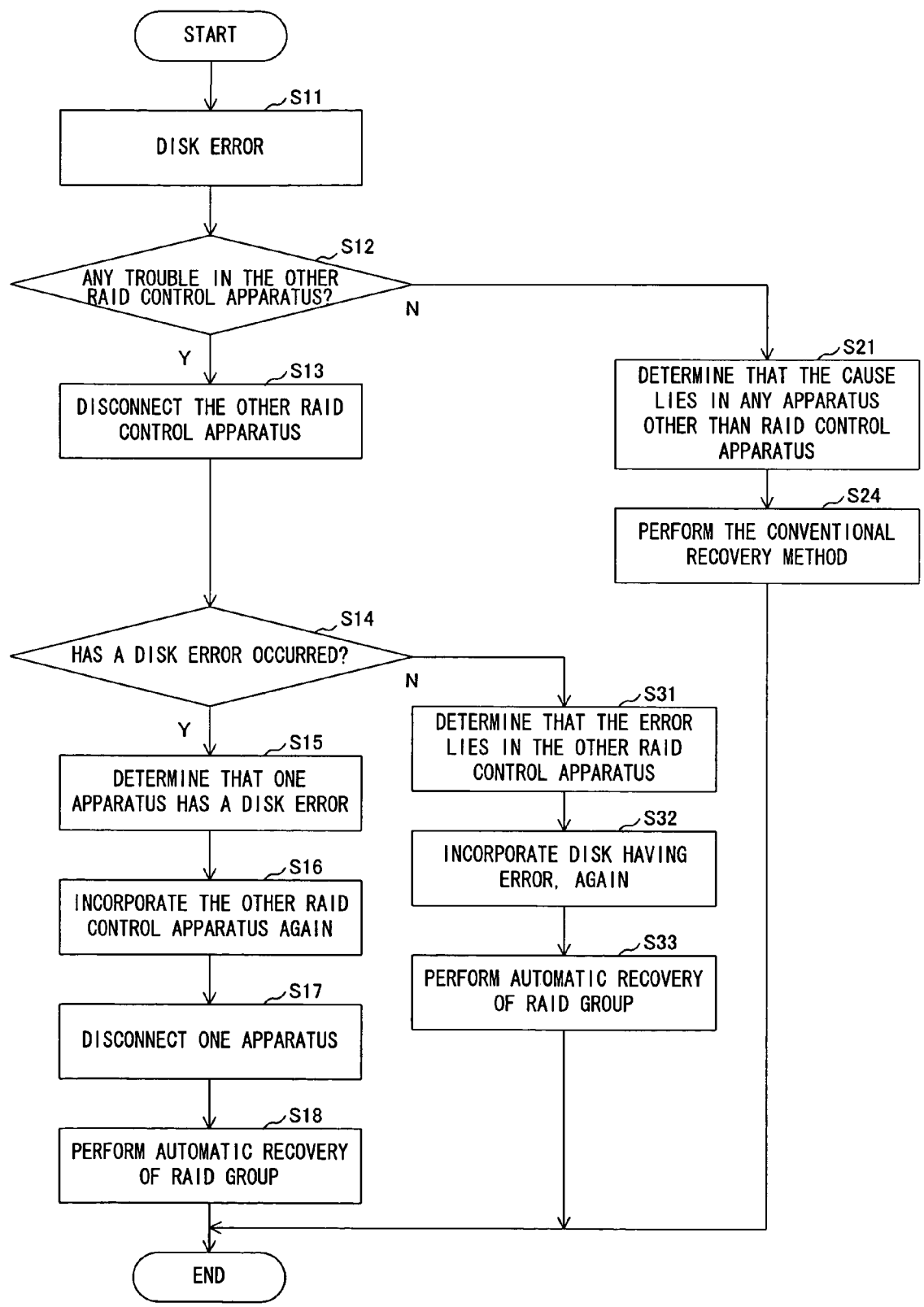
FIG. 2 is a flowchart explaining the operation of one of two RAID control apparatuses provided in the RAID apparatus shown in FIG. 1.

FIG. 2 is a flowchart explaining how the RAID control apparatus $11a$ operates in the RAID apparatus shown in FIG. 1. When the RAID control apparatus $11a$ detects the first disk error occurring in one of the disks $21a$, $21b$, $21c$, $21d$ and $21e$ (S11), it diagnoses the other RAID control apparatus $11b$. That is, the RAID control apparatus $11a$ determines whether the RAID control apparatus $11b$ has a trouble or not (S12). The diagnosis information the RAID control apparatus $11a$ acquires is stored in a readable memory, such as a cache, provided in the RAID control apparatus $11a$. Thus, the diagnosis information can be used in the process of recovering the RAID apparatus from the multi dead/multi unmount state.

If the other RAID control apparatus $11b$ has no troubles (if No in S12), the RAID control apparatus $11a$ determines that the disk error has resulted from any apparatus other than the RAID control apparatus $11b$ (S21).

Then the RAID control apparatus $11a$ carry out, the conventional multi-dead/multi-unmount recovery method shown in FIG. 5 (S24). In this method, the disk having a trouble is forcedly incorporated and replaced, whereby a rebuild process is performed. As a result, the RAID apparatus is enabled to operate. Thus, the flow terminates.

If the other RAID control apparatus $11b$ has a trouble (if Yes in S12), the RAID control apparatus $11a$ disconnects the other RAID control apparatus $11b$ from the RAID apparatus (S13). The RAID control apparatus $11a$ then determines whether the second disk error has occurred within a preset time (S14).

If the second disk error does not occur within the preset time after the RAID control apparatus $11b$ has been disconnected from the RAID apparatus (if No in S14), the RAID control apparatus $11a$ determines that the disk error has occurred in the other RAID control apparatus $11b$, not in any disk at all (S31). The disk that has made an error is incorporated into the RAID apparatus (S32). Next, the RAID group is automatically recovered (S33). As a result, the RAID apparatus is automatically enabled to operate, without replacing any disk with a new one. The flow thus terminates.

The second disk error may occur within the preset time after the RAID control apparatus $11b$ has been disconnected from the RAID apparatus (Yes in S14). In this case, the RAID control apparatus $11a$ determines that the disk error has occurred in itself (S15), and the RAID control apparatus 11*b* is again incorporated into the RAID apparatus (S16). The RAID control apparatus 11*a* therefore disconnects itself from the RAID apparatus (S17). Next, the RAID group is automatically recovered (S18). The flow thus terminates.

As has been indicated, the RAID control apparatus 11*a* disconnects itself from the RAID apparatus in Step S17. Instead, the RAID control apparatus 11*b* incorporated in Step S16 may disconnect the RAID control apparatus 11*a* from the RAID apparatus.

With reference to the flowchart of FIG. 2, it has been described how the RAID control apparatus 11*a* operates. Note that the RAID control apparatus 11*b* can operate in a similar manner.

At the time the first disk error occurs, the two RAID control apparatuses may diagnose each other. If this is the case, the RAID apparatus can be prevented from the multi dead/multi unmount state when the RAID control apparatus that has caused the disk error is disconnected from the RAID apparatus. One RAID control apparatus may malfunction, failing to determine whether the other RAID control apparatus has a trouble, and may disconnect, by mistake, the other RAID control apparatus from the RAID apparatus. Even in this case, the RAID control apparatus is automatically switched into operation again, whereby the cause of the malfunction is determined. This prevents further troubles.

Next, an operation of the RAID control apparatus 11*b* that is once disconnected from the RAID apparatus and incorporated again will be described.

Figure 3:
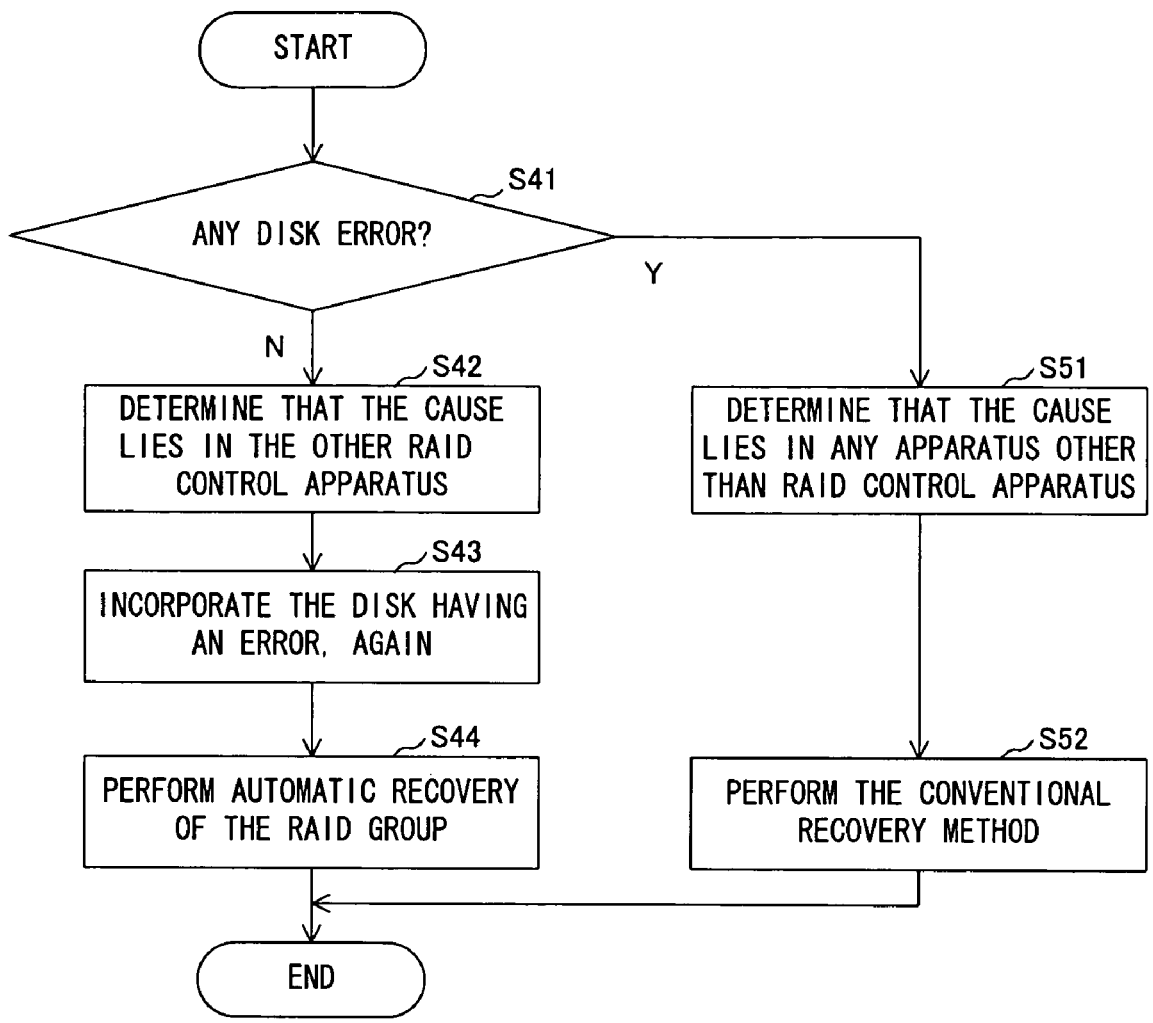
FIG. 3 is a flowchart explaining the operation of the other RAID control apparatus provided in the RAID apparatus shown in FIG. 1.

FIG. 3 is a flowchart explaining how the other RAID control apparatus 11*b* operates in the RAID apparatus shown in FIG. 1. After the RAID control apparatus 11*a* is disconnected from the RAID apparatus, the RAID control apparatus 11*b* determines whether the third disk error has occurred within a preset time (S41).

The third disk error may not occur within the preset time after the RAID control apparatus 11*a* has been disconnected from the RAID apparatus (No in S41). Then, the RAID control apparatus 11*b* determines that the cause of error lies in the RAID control apparatus 11*a*, not in the disks (S42). The disk that has made an error is incorporated into the RAID group again (S43). The RAID group is thereby automatically recovered (S44). As a result, the RAID apparatus is automatically enabled to operate, without replacing any disk with a new one. The flow thus terminates. At this time, the RAID control apparatus 11*b* determines the order in which to recover the disks automatically, from the information acquired in Step S12 or in other processes.

The third disk error may occur within the preset time after the RAID control apparatus 11*a* has been disconnected from the RAID apparatus (Yes in S41). In this case, the RAID control apparatus 11*b* determines that the cause of the error lies in any apparatus other than the RAID control apparatus 11*a* (S51). The RAID control apparatus 11*b* then performs the conventional multi-dead/multi-unmount recovery method (S52). In this method, the disk having a trouble is forcedly incorporated and replaced, whereby a rebuild process is performed. As a result, the RAID apparatus is enabled to operate. Thus, the flow terminates.

With reference to the flowchart of FIG. 3, it has been described how the RAID control apparatus 11*b* operates. Note that the RAID control apparatus 11*a* can operate in a similar manner.

Any component that has brought the RAID apparatus into the multi dead/multi unmount state can therefore be identified. Even if the cause of the trouble lies in any RAID control apparatus, the RAID apparatus can be automatically recovered at high speed.

The RAID control apparatuses are constituted by a computer. The computer can execute RAID-control programs to perform the steps described above. The RAID-control programs may be stored in a computer-readable recording medium. Once this medium has been incorporated in it, the computer that constitutes the RAID control apparatuses can execute the RAID-control programs. The computer-readable recording medium may be an internal storage device such as a ROM or a RAM, a movable storage medium such as a CD-ROM, a flexible disk, a DVD, a magneto-optical disk or an IC card, a database storing computer programs, or another computer and a database installed in the other computer.

The diagnosis unit, control unit and recovery unit correspond to the RAID control apparatuses used in the embodiment described above. The diagnosis step correspond to Step S12 shown in FIG. 2. The recovery step corresponds to Steps S23, S24, S32, S33, S43, S44 and S52, which are shown in FIGS. 2 and 3. The control step corresponds to the steps other than the diagnosis step and control step that are shown in FIGS. 2 and 3.

What is claimed is:

1. A RAID control apparatus that is able to cooperate with another RAID control apparatus to control at least one RAID apparatus, the RAID control apparatus comprising:
    a diagnosis unit that diagnoses the other RAID control apparatus when a disk error is detected; and
    a control unit that stops controlling the RAID apparatus in cooperation with the other RAID control apparatus, whereby only the RAID control apparatus controls the RAID apparatus, when the diagnosis unit determines that the other RAID control apparatus has a trouble, and that causes only the other RAID control apparatus to control the RAID apparatus when another disk error is detected while only the RAID control apparatus is controlling the RAID apparatus.

2. The RAID control apparatus according to claim 1, further comprising a recovery unit that makes a disk having an error usable when no disk errors are detected within a preset time after the RAID control apparatus has started controlling the RAID apparatus alone, thereby to recover the RAID apparatus automatically.

3. The RAID control apparatus according to claim 2, wherein the recovery unit determines that a cause of a disk error lies in the other RAID control apparatus when no disk errors are detected within the preset time after the RAID control apparatus has started controlling the RAID apparatus alone.

4. The RAID control apparatus according to claim 2, wherein the recovery unit helps to recover the RAID apparatus when the diagnosis unit determines that the other RAID control apparatus has no troubles.

5. The RAID control apparatus according to claim 2, wherein the recovery unit helps to recover the RAID apparatus when a disk error is detected within the preset time while controlling the RAID apparatus alone, after the control by only the other RAID control apparatus has been switched to the control by only the RAID control apparatus.

6. The RAID control apparatus according to claim 2, wherein the recovery unit performs the automatic recovery in accordance with diagnosis made by the diagnosis unit or diagnosis made by the recovery unit.

7. A computer readable storage medium having recorded thereon a RAID control program that causes a computer provided in a RAID control apparatus to control at least one RAID apparatus in cooperation with another RAID control apparatus, the program causing the computer to execute:

a diagnosis step that diagnoses the other RAID control apparatus when a disk error is detected; and a control step that stops controlling the RAID apparatus in cooperation with the other RAID control apparatus, whereby only the RAID control apparatus controls the RAID apparatus, when the diagnosis step determines that the other RAID control apparatus has a trouble, and that causes only the other RAID control apparatus to control the RAID apparatus when another disk error is detected while only the RAID control apparatus is controlling the RAID apparatus.

8. The computer readable storage medium according to claim 7, which causes the computer to perform a recovery step that makes a disk having an error usable when no disk errors are detected within a preset time after the RAID control apparatus has started controlling the RAID apparatus alone, thereby to recover the RAID apparatus automatically.

9. The computer readable storage medium according to claim 8, wherein the recovery step determines that a cause of a disk error lies in the other RAID control apparatus when no disk errors are detected within the preset time after the RAID control apparatus has started controlling the RAID apparatus alone.

10. The computer readable storage medium according to claim 8, wherein the recovery step helps to recover the RAID apparatus when the diagnosis step determines that the other RAID control apparatus has no troubles.

11. The computer readable storage medium according to claim 8, wherein the recovery step helps to recover the RAID apparatus when a disk error is detected while controlling the RAID apparatus alone, after the control by only the other RAID control apparatus has been switched to the control by only the RAID control apparatus.

12. The computer readable storage medium according to claim 8, wherein the recovery step performs the automatic recovery in accordance with diagnosis made in the diagnosis step or diagnosis made in the recovery step.

13. A RAID control method for use in a RAID control apparatus that is able to cooperate with another RAID control apparatus to control at least one RAID apparatus, the RAID control method comprising:

a diagnosis step that diagnoses the other RAID control apparatus when a disk error is detected; and a control step that stops controlling the RAID apparatus in cooperation with the other RAID control apparatus, whereby only the RAID control apparatus controls the RAID apparatus, when the diagnosis step determines that the other RAID control apparatus has a trouble, and that causes only the other RAID control apparatus to control the RAID apparatus when another disk error is detected while only the RAID control apparatus is controlling the RAID apparatus.

14. The RAID control method according to claim 13, which causes a computer to perform a recovery step that makes a disk having an error usable when no disk errors are detected within a preset time after the RAID control apparatus has started controlling the RAID apparatus alone, thereby to recover the RAID apparatus automatically.

15. The RAID control method according to claim 14, wherein the recovery step determines that a cause of a disk error lies in the other RAID control apparatus when no disk errors are detected within the preset time after the RAID control apparatus has started controlling the RAID apparatus alone.

16. The RAID control method according to claim 14, wherein the recovery step helps to recover the RAID apparatus when the diagnosis step determines that the other RAID control apparatus has no troubles.

17. The RAID control method according to claim 14, wherein the recovery step helps to recover the RAID apparatus when a disk error is detected while controlling the RAID apparatus alone, after the control by only the other RAID control apparatus has been switched to the control by only the RAID control apparatus.

18. The RAID control method according to claim 14, wherein the recovery step performs the automatic recovery in accordance with diagnosis made in the diagnosis step.

* * * * *

UNITED STATES PATENT AND TRADEMARK OFFICE
CERTIFICATE OF CORRECTION

PATENT NO. : 7,523,347 B2
APPLICATION NO. : 11/376180
DATED : April 21, 2009
INVENTOR(S) : Tomoyuki Kanayama It is certified that error appears in the above-identified patent and that said Letters Patent is hereby corrected as shown below:

Title Page, Item [54] (Title), Lines 1-3, change "RAID CONTROL APPARATUS, AND RAID CONTROL PROGRAM AND RAID CONTROL METHOD" to --RAID CONTROL APPARATUS, RAID CONTROL PROGRAM AND RAID CONTROL METHOD--.

Title Page, Item [57] (Abstract), Line 5, change "an disk" to --a disk--.

Column 1, Lines 1-3, change "RAID CONTROL APPARATUS, AND RAID CONTROL PROGRAM AND RAID CONTROL METHOD" to --RAID CONTROL APPARATUS, RAID CONTROL PROGRAM AND RAID CONTROL METHOD--.

Signed and Sealed this

Twenty-first Day of July, 2009

JOHN DOLL
*Acting Director of the United States Patent and Trademark Office*